United States Patent Office 2,784,058
Patented Mar. 5, 1957

2,784,058

PRODUCTION OF TITANIUM TETRACHLORIDE

Zera L. Hair, Riviera Beach, Md., assignor to E. I. du Pont de Nemours and Company, Wilmington, Del., a corporation of Delaware No Drawing. Application December 20, 1951, Serial No. 262,672

3 Claims. (Cl. 23—87)

This invention relates to the production of titanium tetrachloride by high temperature chlorination methods and more particularly to the production of titanium tetrachloride by fluidized bed chlorination of commercially available titaniferous materials containing slagging reagents such as calcium and magnesium compounds.

The production of titanium tetrachloride by the interaction of titanium oxide and chlorine in the presence of a reducing agent such as carbon in the form of coke is well known. This reaction takes place at elevated temperatures and usually within the range of 500° C.–1250° C. The various naturally occurring titanium ores can be used in the process, but preference has been given to rutile and ilmenite of low iron content. The iron content of the ore becomes chlorinated to form ferrous or ferric chloride depending on the operating conditions and this formation of chlorides of iron yields heat which is beneficial in the processes to help in maintaining the furnace temperature, but the presence of iron chloride in the gaseous product is detrimental in that it complicates the recovery of titanium tetrachloride. For this reason it is desirable to use titaniferous materials which are low in iron.

An early prior art process comprises the briquetting of the ore and coke prior to feeding to a furnace wherein it is exposed to chlorine at the desired operating temperature. Continuous operation is possible when feeding the briquettes into the furnace at the top and removal of ash at the bottom. More recently, attention has been given to the use of a fluidized bed technique wherein the titaniferous material and carbon are fed into the reaction chamber of furnace in a comminuted or finely-divided state (8–200 mesh) and simultaneously feeding chlorine into or near the bottom of the reaction chamber so that the solids are maintained in contact with the gas in a non-static or fluidized condition. Such an operation is often referred to as a bubbling or fluidized bed since the gases move upwardly through the solids similar to the conditions prevailing in the boiling of a liquid when heating the bottom of the container. The reaction produces iron chlorides, carbon monoxide, carbon dioxide in addition to the titanium tetrachloride. These gaseous reaction products are led from the furnace to a condensation system for the separate recovery of iron chloride and titanium tetrachloride.

Commercial attention has been given recently to the recovery of titanium and iron values from titaniferous magnetites such as are to be found in eastern Quebec. The goal here is to recover relatively pure iron and a titanium oxide concentrate which can be used in the manufacture of titanium products. Electric furnace reduction methods are being employed and this gives molten iron and a molten slag. The latter has been found useful in the sulfate process for the manufacture of titanium oxide. While the $TiO_2$ content of the ore may be within the 30–40% range and the iron content from 30–50%, molten iron may be separated therefrom by an electric furnace operation wherein the iron content is substantially reduced to say 15–20% and the $TiO_2$ content of the slag may then run between 60 and 80%. This result is obtained through the use of a carbonaceous reducing agent to convert the iron content of the ore to the metal state and a slagging reagent to assist in maintaining the titanium rich fraction in the liquid state. The slagging reagent may be supplied by impurities in the ore, and by the addition of alkaline earth and/or alkali metal slagging compounds. Such an operation is disclosed in U. S. P. 2,476,453 wherein a slag product containing substantial amounts of alkaline earth compounds such as oxides of calcium and magnesium is disclosed. The smelting of Canadian titaniferous ores in this manner is being adapted commercially and the slag is being made available for conversion to soluble titanium compounds such as titanium sulfate and titanium chloride which are useful in the manufacture of titanium pigments and titanium metal.

The slagging reagents present in the commercially-prepared titaniferous slag product are a source of trouble in the chlorination by prior art methods due to the formation of chlorides of low volatility but which are liquid at the furnace operating conditions. Slags containing substantial amounts of calcium are particularly troublesome and cannot be used unless methods are employed for removal of calcium chloride from the furnace as it is formed. Likewise, same may be said of slags containing magnesium and the other alkaline earth and alkali metals.

This invention has as an object the production of titanium tetrachloride from commercially available impure titanium-bearing materials. A further object is an improved process for the production of titanium tetrachloride from titanium slag materials by means of a fluidized bed reaction. A still further object is the production of titanium tetrachloride by means of a continuously operating fluidized bed reaction, comprising the chlorination of an oxidic titaniferous material containing substantial amounts of impurities which convert to high melting chlorides with boiling points above the furnace temperature required for the titanium chlorination. A specific object is the production of titanium tetrachloride by means of a fluidized bed reaction comprising chlorination of a titanium-bearing material containing substantial amounts of alkaline earth and/or alkali metal compounds, e. g., compounds of calcium, magnesium, sodium, potassium, etc., smelted with titaniferous ores to obtain fluid slags in the separation of primary iron values therefrom.

The above and other objects are realized by the following invention which broadly comprises reacting together the impurity containing titaniferous material, carbon and chlorine in a high temperature reaction chamber under temperature and dilution conditions wherein the chlorides formed in the reaction are volatilized and are removed from the furnace as formed in admixture with the oxides of carbon. The chlorides of the alkaline earth and alkali metals are characterized by low vapor pressure at their melting points, but by using a high temperature for the furnace and by dilution of the gases, one is able to remove these as formed, thereby avoiding the presence of molten salts within the furnace and the resulting stickiness or cementation due to their presence.

My improved process comprises the volatilization of the slagging materials as they are converted to chlorides in the chlorination reaction. This is suitably done by making use of a high magnesium-low calcium slag and by a selection of temperature and dilution conditions within the reactor wherein all of the chlorides of said metals are volatilized and removed from the furnace with the exiting vapors or gases. These conditions are suitably produced by the development of a high temperature within the furnace, i. e., avoidance of radiation losses and by the addition of a diluent to the furnace so as to increase the carrying capacity of the exiting gas for the chlorides of low volatility. Additional heat may be suplied to the furnace by preheating of the solid or gaseous reactants. Additionally, heat may be supplied by simultaneously carrying out exothermic reactions within the chamber such as the combining of carbon with oxygen to give carbon dioxide and carbon monoxide. The temperature used in my improved process should be within the range of 950° C.–1250° C. The high temperature of reaction permits volatilization of the chlorides, but this condition alone does not insure against stickiness and cementation within the reactor since the gas resulting from the reaction itself is not usually present in sufficient volume to carry all of the chlorides in the vapor state when using a slag containing from 4–8% MgO and not more than 2% of calcium oxide, this type of slag being a commercial product and a preferred reagent in my process. Additional volatilization is realized by the addition of a diluent gas to the reaction chamber. This diluent gas is suitably recycled gas from the condenser system after the removal of titanium tetrachloride from the gas stream exiting from the chlorination furnace. It is a mixture of the oxides of carbon plus a small amount of uncondensed titanium tetrachloride and any difficultly condensible gases which may be passed out of the reaction chamber. It is obvious that when constant conditions prevail within the reaction chamber, these gases simply pass through the system without taking part in the reaction, and may be considered a "carrying gas," or a "diluent gas." Other carrying or diluent gases may be used, it being understood that they are equivalent of the recycled gas and may be nitrogen or air in combination with additional carbon to increase the total volume of gaseous products and increase the supply of heat to the furnace.

The reactor temperature is the result of many factors of which the heat generated by the reaction is important. The reaction is exothermic, but the amount of heat released by reaction will depend to a large extent upon the composition of the ore. The loss of heat from the reaction is made up of radiation losses and the heat carried from the furnace by the reaction products. Heat may be added by preheating the reactants and by adding gases, oxygen or air along with the chlorine to combine with carbon within the reaction chamber. It is obvious that the rate of reaction will depend upon the fineness of the ingredients and the temperature, but it is also important that the solid reagents should not be blown from the reactor due to extreme fineness or excessive gas velocity.

In the normal operation of such a system, the $TiO_2$ content of the bed is usually present in considerable excess of the amount of chlorine being passed through the bed, i. e., the amount of chlorine present in the reactor at any moment. However, it is necessary to add chlorine at a rate greater than it reacts to form titanium tetrachloride and ferrous chloride when one wishes to insure the formation of ferric chloride. Either of the iron chlorides may be produced by proper control but with lesser amounts of chlorine, ferrous chloride, the less volatile compound, will result. The total gas flow within the reaction should be maintained within the range of .1 to 1.5 ft. per second to provide the flow necessary for suspension of the reactant fluid particles in the fluidized bed which flow, of course, can be adapted to the particle size distribution within the reaction chamber. A high yield of the chlorides of titanium and iron can be maintained for indefinite periods with very little loss of unreacted chlorine.

The following specific examples are presented as illustrative of my invention, it being understood that the process is amenable to modifications and deviations without departing from the concepts as presented herein.

*Example 1*

A titaniferous slag containing calcium and magnesium was produced by adding a Canadian titaniferous magnetite in combination with a minor amount of a magnesia mineral and coke to an electric furnace where the whole was melted and converted to liquid slag and liquid iron. These were separated and cooled in the conventional way and the slag showed the following analysis:

| | Percent |
|---|---|
| $TiO_2$ (total) | 76.95 |
| $Ti_2O_3$ (calculated as $TiO_2$) | 19.35 |
| Fe (total) | 8.73 |
| $SiO_2$ | 2.42 |
| $Al_2O_3$ | 4.69 |
| CaO | .24 |
| MgO | 5.35 |

This slag was ground to pass 20 mesh and examined for particle size distribution, the following data being obtained:

| Screen size: | Weight percent |
|---|---|
| +20 | .9 |
| −20+35 | 21.9 |
| −35+65 | 20.8 |
| −65+100 | 15.3 |
| −100+150 | 10.9 |
| −150 | 30.9 |

Coke, ground to pass a 20 mesh screen and analyzing 87.0% carbon, 1.2% iron, 7.6% silica, 0.18% CaO, 0.16% MgO and 5.1% $Al_2O_3$, was used as the reducing agent. This was fed to a fluidized bed reactor heated to 950° C. at the rate of 130 pounds per hour along with 324 pounds of the slag which had been preheated to 950° C. and 527 pounds of chlorine, the latter being added as a gaseous stream into the bottom of the reactor and serving to keep the solids in fluidized state. The reactor chamber comprised a vertical brick lined cylindrical chamber. The reactor was provided with inlets for the ground slag and for the ground coke, an outlet at the top for gas reaction products, inlets in the bottom for the chlorine feed gas mixture and an outlet close to the bottom for removing the granular solid furnace bed material. The product gas exit line was brick lined and entered a vertical tubular metal cooler. Provision at the top of the cooler was made for adding inert quenching solids. The lower end of the cooling pipe line entered a cyclone separator for the removal of the added cooling solids along with the condensed phases of $MgCl_2$ and $CaCl_2$ and any molten chlorides of similar volatility. The gas exited from the cyclone contained the $TiCl_4$, $FeCl_3$, $AlCl_3$ and other lower boiling product gases as well as the non-condensables such as $N_2$ and the oxides of carbon formed within the reactor. The $FeCl_3$ was separated from the $TiCl_4$ in a spray condenser in accordance with the teachings of U. S. Patent 2,446,181 and $TiCl_4$ at a rate of about 560 pounds per hour was condensed in water cooled condenser thereafter. A large portion of the non-condensables were recycled to the fluidized reaction chamber by mixing with the incoming chlorine to make a recycled gas concentration of about 65% by volume in the gases entering the fluidized reactor. That portion of the non-condensables not recirculated, was exhausted to the atmosphere after removing unreacted chlorine in an aqueous scrubbing tower. The gaseous mixture containing about 35% chlorine resulted in a gas velocity upwardly thru the reactor of about .8 of a foot per second. The operating temperature of the fluidized bed was 950° C. The bed height maintained was ⅓ to ½ the height of the reactor. Chlorine utilization of 95–98% was obtained. At 950° C., continuous operation was maintained without difficulty, and the soluble chloride content of the bed remained at 4–7% on ashed basis. The product gases were quenched to 700° C. by continuous addition of 750–800 #/hr. on dry sand (granular, −20 mesh) at the top of the cooler. This sand was removed from the system in the cyclone at the bottom of the cooler, a large part of the vaporized $MgCl_2$ and $CaCl_2$ being condensed on the sand, the remainder being taken out with the $FeCl_3$ in the spray condenser.

The inert content of the fluidized reaction bed was maintained between 25 and 50% by daily periodic purges, which resulted in an average loss about 3% of $TiO_2$ from the system. Some minor amounts of the very fine bed particles were blown over into the pipe line quench cooler, and were collected with the sand coolant, in the cyclone separator below the pipe line cooler.

Throughout this process conditions remained in a relative steady state, with no tendency for the bed particles to become sticky, and no reduction in chlorine efficiency. Furthermore, cooling conditions remained relatively constant, showing no build-up of the molten salts on the cooler walls due to the scrubbing action of the inert solids upon the walls of the cooler due to the condensation of the $MgCl_2$ and $CaCl_2$ vapors, on the sand, rather than on the walls of the cooler.

*Example II*

In the fluidized bed chlorination reactor one-third larger than but similar to that described in Example I, 805 pounds per hour of liquid $TiCl_4$ were produced from a ground titaniferous slag also produced by electric furnace slagging of titaniferous iron ore in the presence of a flux and coke and having the following composition.

| | Percent |
|---|---|
| $TiO_2$ | 53.7 |
| $Ti_2O_3$ as $TiO_2$ | 6.2 |
| FeO | 20.5 |
| Fe metal | .63 |
| MgO | 5.94 |
| CaO | 1.85 |
| $SiO_2$ | 4.83 |
| $Al_2O_3$ | 3.64 |

This ground slag was fed to an oil fired preheater at 600 pounds/hour and was discharged at about 1000° C. into the fluidized bed reactor. Simultaneously, the reactor was fed with 200 pounds per hour of ground (—20 mesh) coke, of substantially same chemical analysis as that used in Example I. This was fed after thorough drying, and was at a temperature about 25–50° C.

The fluidized reaction bed was maintained in a fluidized condition without sticking at 1100° C. by the addition of chlorine gas diluted to 35% with a portion of the effluent reactor gas after chilling to remove the condensable chlorides at the bottom of the reactor at the rate of 970 pounds of chlorine per hour. This corresponded to a gas velocity of about .65 ft. per second. The product gases along with the vaporized portion of the $CaCl_2$ and $MgCl_2$ were discharged thru the exit at the top of the furnace to the pipe line quench cooler. At the top of the quench cooler, 90–100 gallons per hour of liquid $TiCl_4$ at 40–50° C. were sprayed into the gas stream thru a nozzle, causing quick cooling and condensing of the $CaCl_2$ and $MgCl_2$ to solid dustlike particles, nucleated by the sprayed droplets of $TiCl_4$. These particles were carried thru the cooler without serious deposition on the side walls and were collected in the cyclone at the bottom of the cooler and removed from the product gas stream at that point. The product gas stream, along with the vaporized quench $TiCl_4$ was passed thru a condensing system as described in Example I. The ferric chloride separated as a solid and the $TiCl_4$ recovered as a liquid. Because of the increased fluidized bed temperature, the inerts such as $SiO_2$ and $Al_2O_3$ chlorinated to a higher degree, and the intermittent purge from the fluidized bed was reduced to a 1% loss ($TiO_2$ basis).

The above examples illustrate my improved process and its usefulness in the production of titanium tetrachloride from raw materials containing up to 8% magnesium oxide and up to 2% of calcium oxide. Such material is useful in a fluidized bed chlorination operation, due to the fact that the alkaline earth chloride products are removed as formed by maintaining the partial pressure of the alkaline earth chloride in the gaseous product stream less than the vapor pressure of the alkaline earth chloride at the temperature of the reaction. This removal of the alkaline earth chloride is less difficult at high operating temperature conditions, but with the commercial slag products, temperature alone is not sufficient to avoid a build-up of alkaline earth chloride salts within the reactor and this eventually leads to plugging of the reactor due to the stickiness of the molten salt. Dilution of the gaseous reaction products lowers the partial pressure of the alkaline earth chloride in the product stream and it is this mode of operation which provides complete removal of the salts of low volatility. I have found that the most suitable diluent is the non-condensable portion of the product stream, this being returned to the reactor after a condensation of $TiCl_4$ therefrom. This gas contains small amounts of uncondensed $TiCl_4$ which is returned to the chlorination furnace and one avoids the production of increased volumes of waste gases in this manner. There is simply an increased volume of gases proceeding from the furnace to the condensers with a portion of it being recycled back to the furnace. This mode of operation is of particular commercial significance since I am able to chlorinate satisfactorily commercial titanium slag products.

The gaseous stream leaving the chlorination furnace is unsaturated as regards the alkaline earth chloride carried therein as a vapor and the dew point of the alkaline earth chloride is below the temperature of the gases leaving the bed. During the operation this relationship should be observed from time to time and, if the condition is not met, additional uncondensable gases should be returned to the furnace to insure complete removal of the alkaline earth chlorides through a lowering of the dew point in the stream.

The reactants used in my process are the titaniferous product containing the alkaline earth compounds, a solid carbonaceous reducing agent, such as coke, and chlorine. The carbon should be used in an amount substantially equivalent to the oxygen entering the reactor in either elemental or metal oxide form. It is converted to carbon dioxide and carbon monoxide during the reaction, the resulting oxides appearing in the gas stream leaving the reactor and passing on through the condensing system as uncondensed gases. A portion of the oxides of carbon is recycled along with other gases to the furnace to insure the removal of the alkaline earth chlorides in vaporous form. It is obvious that the chlorine is added at the rate at which it is reacted to form metal chlorides and in amount equivalent to the metal oxides undergoing chlorination.

Generally, my invention may be utilized to chlorinate, in a fluidized bed, titaniferous ores or slags containing substantial amounts of MgO and CaO as herein described, however, it is obvious that the method may be applied to titaniferous ores and slags containing substantial amounts of other alkaline earth, or alkali metal oxides which convert to chlorides that melt in the range of the fluidized bed operation and have boiling points of 1250° C. or above. Such ores as sphene and pervoskite may be used. Furthermore, quench cooling may be carried out with inert solids other than sand, for example coke, titaniferous ore, or slag. The liquid used as a quench coolant may be liquids other than $TiCl_4$, or IV group chlorides. Metallic halides nonreactive with $TiCl_4$ or the other reaction product gases, which may be separated from the $TiCl_4$ product readily, by usual methods, such as distillation. The method of producing titanium tetrachloride as outlined above is responsive to many of the variations and modifications previously proposed for such systems as long as the critical conditions which I have specified prevail. The appended claims should be construed to cover modified operations which are consistent with the said conditions.

I claim as my invention:

1. A process for the production of titanium tetrachloride from an alkaline earth containing titaniferous slag product which comprises adding the slag and carbon to a hot fluidized bed reaction chamber maintained at 950° C.–1250° C., adding the chlorine to said chamber and passing it upwardly through the bed to provide the fluidization while reacting to form metal chlorides, removing the alkaline earth metal chloride reaction product in volatilized state, as formed and as a part of the exiting gas stream from the chamber by maintaining the partial pressure of the alkaline earth metal chloride in said stream less than the vapor pressure of the alkaline earth chloride at the reaction chamber temperature by mixing a diluent gas, in an amount sufficient to constitute about 65% by volume of the gases entering said reaction chamber, with the gases within said chamber, and recovering the titanium tetrachloride from the chloride containing gases removed from the chamber.

2. A process for the production of titanium tetrachloride from a finely divided alkaline earth containing titaniferous slag product having up to 8% MgO and up to 2% CaO which comprises adding the finely divided slag and carbon to a hot fluidized bed reaction chamber maintained at 950° C.–1250° C., adding chlorine to said chamber for passage upwardly through the bed to provide the fluidization while reacting to form metal chlorides, removing the alkaline earth metal chloride reaction product as formed in the vaporous state as a part of the exiting gas stream from the chamber by maintaining the dew point of the alkaline earth metal chloride in said stream below the temperature of the gases leaving said bed by incorporating a diluting gas, in an amount sufficient to constitute about 65% by volume of the gases entering said reaction chamber, in the gases within said chamber and passing the chloride containing gases exited to a recovery system for the separation of titanium tetrachloride therefrom.

3. A process for the production of titanium tetrachloride from a magnesium containing titaniferous slag product, which comprises adding the slag and carbon to a hot fluidized bed reaction chamber maintained at 950° C.–1250° C., adding the chlorine to said chamber for passage upwardly through the bed to provide the fluidization while reacting to form metal chlorides, removing the magnesium chloride reaction product in volatilized state, as formed, and as a part of the exiting gas stream by maintaining the partial pressure of the magnesium chloride in said stream less than the vapor pressure of magnesium chloride at the reaction temperature by dilution of the reaction chamber gases within said chamber by a return thereto of a portion of the gases exited from the reaction chamber subsequent to removal of condensable metal chlorides, said portion of the exited gases being in an amount sufficient to constitute about 65% by volume of the gases entering said reaction chamber, and recovering the titanium tetrachloride from the exited chloride containing gases.

References Cited in the file of this patent

UNITED STATES PATENTS

| | | |
|---|---|---|
| 1,730,548 | Welch | Oct. 8, 1929 |
| 1,845,342 | Saklatwalla | Feb. 16, 1932 |
| 2,133,997 | Maier | Oct. 25, 1938 |
| 2,184,887 | Muskat et al. | Dec. 26, 1939 |
| 2,378,675 | Agnew et al. | June 19, 1945 |
| 2,476,453 | Pierce et al. | July 19, 1949 |
| 2,486,912 | Belchetz | Nov. 1, 1949 |
| 2,531,926 | Todd et al. | Nov. 28, 1950 |
| 2,555,374 | Rowe et al. | June 5, 1951 |
| 2,622,005 | Aagaard et al. | Dec. 16, 1952 |
| 2,701,179 | McKinney | Feb. 1, 1955 |
| 2,701,180 | Krchma | Feb. 1, 1955 |

OTHER REFERENCES

"Handbook of Chem. and Physics," 16th. ed., pp. 250–251 (showing B. P. of $MgCl_2$ as 1412° C.), Chem. Rubber Pub. Co., Cleveland.

"Titanium," by J. Barksdale, 1949 ed., p. 33, the Ronald Press Co., N. Y.

Article in Metals Transactions, vol. 185, November 1949, pp. 785–788, by R. G. Knicherbocker et al.